United States Patent [19]

Grueninger

[11] 4,108,812

[45] Aug. 22, 1978

[54] AQUEOUS PRINTING INKS

[75] Inventor: Erwin Grueninger, Basel, Switzerland

[73] Assignee: Sandoz Ltd., Basel, Switzerland

[21] Appl. No.: 636,815

[22] Filed: Dec. 1, 1975

[30] Foreign Application Priority Data

Dec. 5, 1974 [SE] Sweden .............................. 7416159

[51] Int. Cl.$^2$ ...................... B32B 21/06; C09D 11/02; D21C 5/02
[52] U.S. Cl. ......................................... 260/24; 162/6; 260/29.2 EP; 260/29.2 N; 260/29.6 NR
[58] Field of Search .............. 8/100; 260/24, 29.2 EP, 260/29.2 TN

[56] References Cited

U.S. PATENT DOCUMENTS

| | | | |
|---|---|---|---|
| 2,197,442 | 4/1940 | Widmer | 260/39 P |
| 2,328,900 | 9/1943 | Grimm et al. | 8/31 |
| 3,190,850 | 6/1965 | Burke | 260/39 R |
| 3,545,909 | 12/1970 | Gagliardi | 8/17 |
| 3,632,559 | 1/1972 | Matter et al. | 260/78 SC |
| 3,864,296 | 2/1975 | Faessinger | 260/29.2 EP |

*Primary Examiner*—Murray Tillman
*Assistant Examiner*—A. H. Koeckert
*Attorney, Agent, or Firm*—Gerald D. Sharkin; Richard E. Vila; Thomas C. Doyle

[57] ABSTRACT

Disclosed are aqueous printing inks comprising an anionic dyestuff, a cationic fixing agent and ammonia or a volatile amine, and the use thereof in flexographic printing, particularly of tissue papers.

14 Claims, No Drawings

AQUEOUS PRINTING INKS

The invention relates to printing inks and particularly to inks for use in flexo-printing.

Thus, according to the invention, there is provided an aqueous printing ink comprising an anionic dyestuff, a cationic fixing agent and ammonia or a volatile amine.

The preferred cationic fixing agents are the known polyamide amines, particularly those described in Swiss Pat. No. 491,153 and U.S. Pat. No. 3,632,559. Of special interest are the hydro-soluble polymers produced by crosslinking polyamide amines containing the functional groups of formula I,

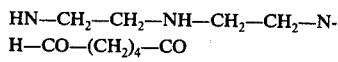

with bifunctional alkylating agents of formula

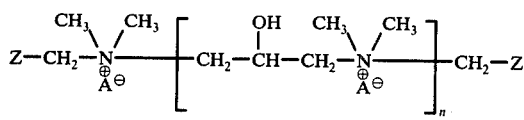

where $A^{\ominus}$ is an anion,
n is 0 to 3, and
Z is

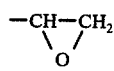

or $-CH(OH)-CH_2Cl$ in such proportions that all epoxy or halogenohydrin groups in the crosslinking agent capable of effecting alkylation are reacted without producing a water-insoluble product.

The cationic fixing agent is preferably present in the ink composition in an amount of from 3 to 20%, more preferably 6 to 12% and most preferably 8 to 10%, by weight.

The presence of the amine in the ink compositions inhibits, we have found, premature reaction between the cationic fixing agent and anionic dyestuff, which premature reaction has hitherto lead to the fixing agent and dyestuff having to be applied separately to the substrate. The volatility of the amine should be such that it evaporates from the finally produced print at least when such is subjected to a temperature of from 60° to 80° C, i.e. the conventional drying temperature in flexo-print processes. The preferred amines are the alkyl amines in which the alkyl moieties are of 1 to 4 carbon atoms, and the alkanolamines in which the alkyl moieties are of 2 to 4 carbon atoms, as well as morpholine. The particularly preferred amines are mono- and triethanolamine.

The ammonia or amine is preferably present in an amount of from 5 to 50% by weight of the ink composition and, particularly with mono- and triethanolamine, the more preferred amount is from 5 to 30%, particularly from 10 to 25% and especially from 15 to 20%.

The anionic dyestuffs are those which contain sulphonic acid and/or carboxylic acid groups. They may belong, for example, to the so-called acid, direct, indigo brine, reactive, metal-complex or metallisable dyestuff classes. They are described in the "Colour Index" (1956 and Supplementary Work 1963) under the descriptions "Acid Dyes", "Direct Dyes", "Reactive Dyes", "Mordant Dyes" and "Solubilized Vat Dyes", the reactive, acid, direct and indigo brine dyestuffs being particularly suitable for inclusion in the ink compositions of the present invention.

The amount of dyestuff present in the ink is, of course, determined by the depth of colour required in the final print. Generally, the amount of dyestuff is from 1 to 12%, preferably from 3 to 7%, by weight. As will be appreciated, mixtures of dyestuffs may be employed.

The amount of water in the ink composition may be up to 70% by weight, depending on the desired viscosity. Preferably, however, it is present in an amount of from 30 to 50%.

In order to improve storage stability of the inks according to the invention, the pH thereof is preferably controlled to lie above a value of 8, the preferred range being from 9 to 12, particularly from 9.5 to 11.

In addition to the dyestuff, fixing agent, ammonia or amine and water, the inks provided by the invention may contain other additives conventional in printing inks in the flexo-printing art. Thus, they may contain binding agents, e.g. saponifiable colophony derivatives and polymers, co-polymers or mixed polymers of acrylic acid and its derivatives. The preferred binding agents are the saponifiable maleic resins having an acid count of from 100 to 200, e.g. as sold under the Trade Name "Beckacite". Where a binding agent is employed in the ink, such may, for example, be present in an amount up to 10% by weight. Organic solvents, miscible with the water in the inks may also be incorporated. In this connection, in order to reduce tackiness in the ink, a glycol or glycol derivative is conveniently added, particularly ethylene glycol which may be present in an amount of up to 40% preferably from 15 to 20% by weight.

The viscosity of the inks according to the invention is preferably such as to give an outflow time of 20 to 30 seconds in a DIN beaker 4.

The inks according to the invention may be made by thoroughly admixing together the constituent ingredients, avoiding, of course, admixture of the cationic fixing agent with the anionic dyestuff in the absence of the ammonia or volatile amine. Conveniently, the cationic fixing agent is added last. Where binding agents and a glycol or glycol derivative are to be incorporated in the inks, these two components are preferably first admixed together, followed by addition of the ammonia or volatile amine, then water followed by the dyestuff and finally the cationic fixing agent.

As previously indicated, the inks provided by the invention are particularly suitable for use in flexo-printing processes. Of particular interest is their use in printing papers, and most particularly tissue papers by flexoprinting methods. When used on such papers, the final prints show marked resistance to bleeding when contacted with water or alcohol.

The following Examples, in which all parts and percentages are by weight and all temperatures in degrees centigrade, illustrate the invention.

EXAMPLE 1

15 parts of a 25% aqueous "Beckacite K 110" solution [consisting of 25 parts of "Beckacite K 110" 100% (maleinate resin of the firm Reichhold Chemie), 5 parts of triethanol amine, 35 parts of butyl glycol and 35 parts of $H_2O$] are stirred well with
    20 parts of triethanol amine and
    15 parts of ethylene glycol and 16 parts of water. Then, 4 parts of the dyestuff C.I. Direct Orange 118 are stirred into the homogeneous mixture until it forms a solution, and then 30 parts of a commercial 30% cationic polyamide amine resin, according to example 1 of Swiss Patent Specification 491 153, are stirred in again until homogeneity.

The mixture obtained is stable in storage at a pH of 9.4 – 9.8 and gives dyeings by flexo-print on tissue paper, which have excellent bleeding resistance to water and alcohols. The papers dyed are bleachable and may be worked on again as waste paper (after chlorine bleaching) together with fresh cellulose.

EXAMPLE 2

A mixture produced as described in example 1, consisting of:

15 parts of "Beckacite K 110" solution (25%, as in example 1)
35 parts of ethylene glycol
15 parts of triethanol amine
5 parts of C.I. Direct Black 155, is stirred until homogeneity after it has become a complete solution, together with
30 parts of a 30% polyamide resin according to example 1.

A printing ink composition which may be stored (at a pH-value of 9.4 – 9.8) and which has the properties described in example 1 is obtained.

EXAMPLE 3

A homogeneous solution is produced as described in example 1 from 15 parts of "Beckacite K 110" solution (25%, as in example 1) and
20 parts of triethanol amine
30 parts of water and
5 parts of C.I. Reactive Blue 105.
30 parts of a 30% polyamide amine according to example 1 are then stirred slowly into this mixture until homogeneity.

A printing ink composition which may be stored (at a pH-value of 11-12) and which has the properties described in example 1 is obtained.

Instead of the binding agent "Beckacite K 110" mentioned in the previous examples, the following saponifiable colophony derivatives may also be used:

"Pentalyn" 255 (hercules powder)
"Arochem" 455 (Scado)
"Dymerex" (Hercules powder) "Enmesin M-57W" (Leon Frenkel Ltd. Kent, GB)

Printing ink compositions which can be stored may also be obtained by partially or completely replacing the triethanol amine by ammonia, isobutyl amine, triisopropyl amine, morpholine or monoethanol amine.

EXAMPLE 4

The fastness to water and to alcohol under the conditions given in the table are tested on tissue paper using the anionic and reactive dyestuffs described in the following table. The printing ink compositions used for printing are produced as described in example 1. They have the following composition:

15 parts of "Beckacite K 110" (25%, as in example 1)
20 parts of monoethanol amine
X parts of water Y parts of dyestuff (for amount see table)
30 parts of 30% polyamide amine resin as in example 1
Total 100 parts All printing ink compositions of the anionic dyestuffs are stable in storage at a pH-value of 9.4 – 9.8, those of the reactive dyestuffs are stable in storage at a pH value of 11–12.

TESTING CONDITIONS

Water fastness: 10 mins. at about 22° C
Alcohol fastness: 10 mins. at about 22° C with 50% ethanol.
Evaluation according to grey scale.

Table

| Dyestuff | Dyestuff Composition (solid) |
|---|---|
| C.I. Direct Yellow 133 | 3,0 |
| C.I. Direct Orange 118 | 3,8 |
| C.I. Direct Red 239 | 2,75 |
| C.I. Direct Blue 267 | 2,0 |
| C.I. Direct Blue 15 | 3,0 |
| C.I. Reactive Yellow 83 | 5,0 |
| C.I. Reactive Red 119 | 5,0 |
| C.I. Reactive Blue 105 | 5,0 |

In all cases, improved fastness to water and to alcohol was noted in the range of 4–5.

What we claim is:

1. A storage-stable aqueous printing ink comprising (1) an anionic dyestuff, (2) a cationic fixing agent which is a hydrosoluble polymer produced by cross-linking a polyamide amine containing the functional groups of formula

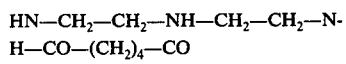

with a bifunctional alkylating agent of formula

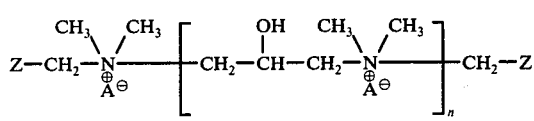

where A⊕ is an anion,
n is 0 to 3, and
Z is

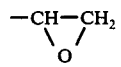

or —CH(OH)—CH₂Cl in such proportions that all epoxy or halogenohydrin groups in the crosslinking agent capable of effecting alkylation are reacted without producing a water-insoluble product, and (3) a sufficient amount of ammonia or a volatile amine to inhibit premature reaction between said cationic fixing agent and said anionic dyestuff.

2. An ink according to claim 1, wherein the fixing agent is present in the ink in an amount of from 3 to 20%, by weight.

3. An ink according to claim 1, wherein said amine is an alkylamine, in which the alkyl moieties are of 1 to 4 carbon atoms, an alkanolamine, in which the alkyl moieties are of 2 to 4 carbon atoms, or morpholine.

4. An ink according to claim 3, wherein said amine is mono- or triethanolamine.

5. An ink according to claim 1, wherein the ammonia or amine is present in an amount of from 5 to 50% by weight.

6. An ink according to claim 1, wherein the pH is controlled to lie above a value of 8.

7. An ink according to claim 1, containing additionally a binding agent.

8. An ink according to claim 7, wherein said binding agent is a saponifiable colophony derivative, a polymer, co-polymer or mixed polymer of acrylic acid or a saponifiable maleic resin having an acid count of from 100 to 200.

9. An ink according to claim 8, wherein said binding agent is a saponifiable maleic resin having an acid count of from 100 to 200.

10. An ink according to claim 7, wherein the binding agent is present in an amount up to 10%, by weight.

11. An ink according to claim 1, containing additionally an organic solvent miscible with the water therein.

12. An ink according to claim 11, wherein the ethylene glycol is present in an amount of from 15 to 20%, by weight.

13. An ink according to claim 1, having a viscosity such as to give an outflow time of 20 to 30 seconds in a DIN beaker 4.

14. An ink according to claim 1 wherein the ammonia or amine is present in an amount of 5 to 50% by weight, with the amine being one which evaporates at a temperature of 60° to 80° C. or less; the cationic fixing agent is present in an amount of 3 to 20% by weight and the dye is present in an amount of 1 to 12% by weight and the pH is above 8.

* * * * *